United States Patent

Guillez

[11] Patent Number: 6,030,023
[45] Date of Patent: Feb. 29, 2000

[54] DEVICE FOR OPENING AND CLOSING THE TRUNK LID AND THE REAR CROSSMEMBER OF A CONVERTIBLE VEHICLE

[75] Inventor: Jean Marc Guillez, Cirieres, France

[73] Assignee: France Design, Cerisay, France

[21] Appl. No.: 09/022,810

[22] Filed: Feb. 12, 1998

[30] Foreign Application Priority Data

Feb. 20, 1997 [FR] France ................................ 97/02024

[51] Int. Cl.$^7$ ........................................................ B60J 7/20
[52] U.S. Cl. ................................... 296/136; 296/107.08
[58] Field of Search ................................ 296/108, 136, 296/107.08

[56] References Cited

U.S. PATENT DOCUMENTS

| 2,599,277 | 6/1952 | Orr | 296/136 |
|---|---|---|---|
| 3,338,624 | 8/1967 | Champion | 296/136 |
| 5,573,296 | 11/1996 | Lienenkamp | 296/136 |

FOREIGN PATENT DOCUMENTS

| 2728199 | 6/1996 | France | 296/136 |
|---|---|---|---|
| 3743502 | 7/1989 | Germany . | |
| 4445941 | 3/1996 | Germany . | |
| 90817 | 4/1989 | Japan | 296/136 |

*Primary Examiner*—Dennis H. Pedder
*Attorney, Agent, or Firm*—Bachman & LaPointe, P.C.

[57] ABSTRACT

A device opens and closes the trunk lid and the rear crossmember of a convertible vehicle having a foldable hard top to enable the hard top to be moved into the trunk and removed therefrom. The trunk lid opens by rotation from the front towards the rear. The opening and closing device rotates the rear crossmember forwards and downwards on rotation on the trunk lid from the front towards the rear and rearwards and upwards when the trunk lid rotates in the opposite direction.

6 Claims, 1 Drawing Sheet

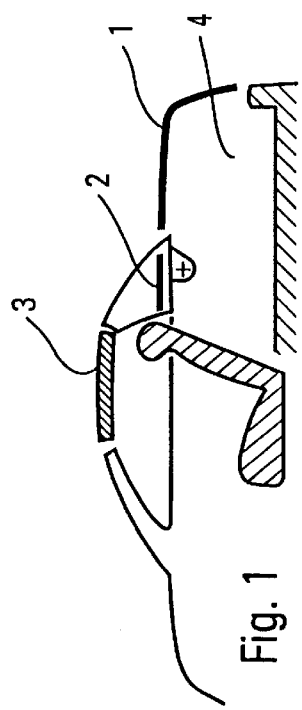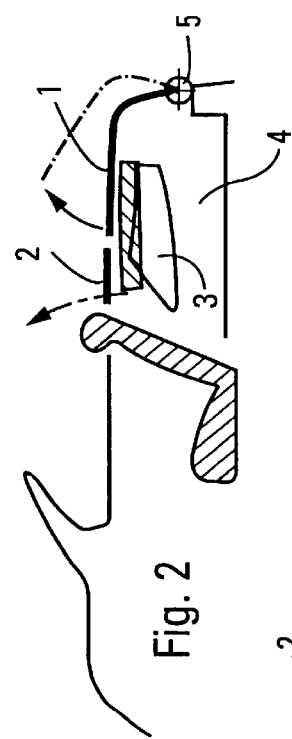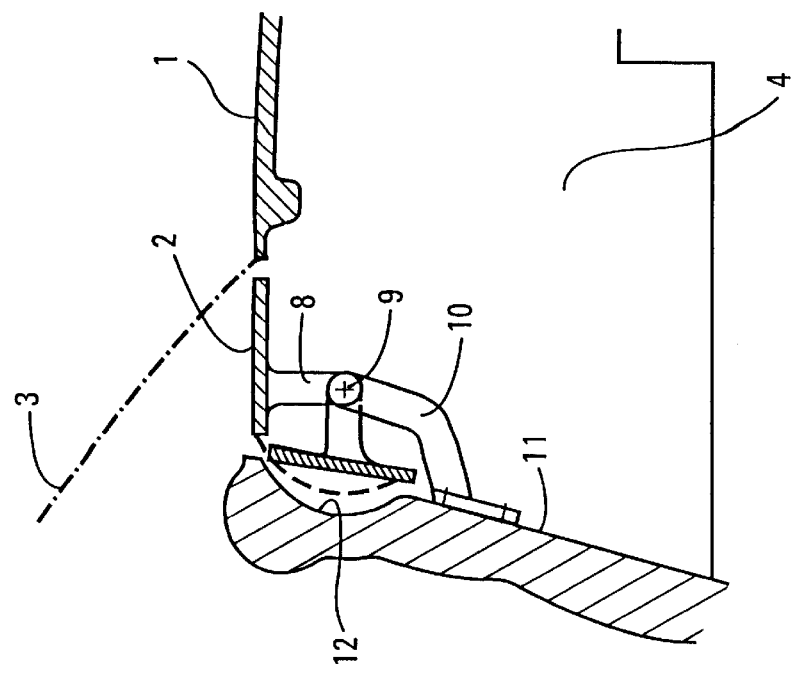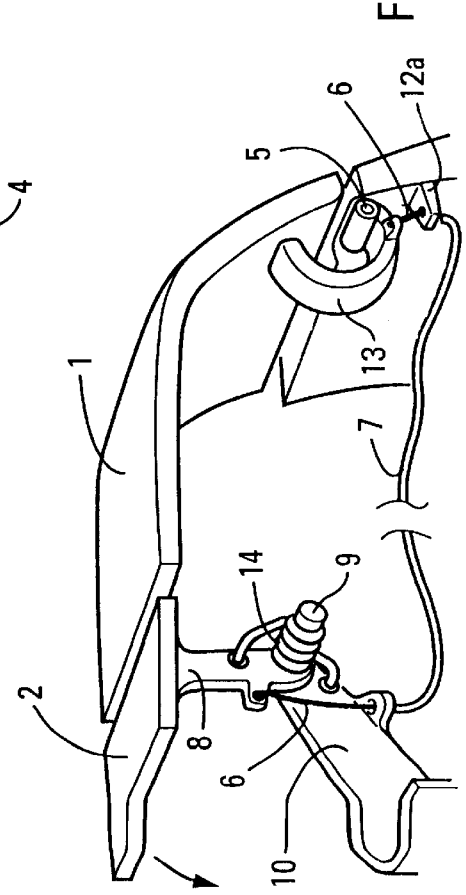

DEVICE FOR OPENING AND CLOSING THE TRUNK LID AND THE REAR CROSSMEMBER OF A CONVERTIBLE VEHICLE

BACKGROUND OF THE INVENTION

1. Field of the Invention

The present invention concerns a device for opening and closing the trunk lid and the rear crossmember of a convertible vehicle having a folding hard top to enable the hard top to be moved into the trunk and removed therefrom, the trunk lid being able to open in the direction from the front towards the rear.

2. Description of the Prior Art

French patent 2 728 199 discloses a device of the above kind in which the rear crossmember pivots forwards and downwards when the hard top is moved towards the trunk after opening the trunk lid from the front towards the rear.

A device of the above kind requires many complex articulated parts.

The aim of the present invention is to remedy this drawback.

SUMMARY OF THE INVENTION

The invention consists in a device for opening and closing the trunk lid and the rear crossmember of a convertible vehicle having a foldable hard top to enable the hard top to be moved into the trunk and removed therefrom, the trunk lid being adapted to open by rotation from the front towards the rear, the device comprising means for rotating the rear crossmember forwards and downwards on rotation on the trunk lid from the front towards the rear and rearwards and upwards when said trunk lid rotates in the opposite direction.

Accordingly, when the trunk lid is opened, the rear crossmember pivots forwards and downwards, which is the opposite to what happens in the device described in French patent 2 278 199.

Accordingly, the rear crossmember is completely retracted to provide a passage for the hard top.

Other features and advantages of the invention will become more apparent from the following description.

BRIEF DESCRIPTION OF THE DRAWINGS

In the appended drawings, given by way of non-limiting example:

FIG. 1 is a schematic view in longitudinal section of a convertible vehicle equipped with a device in accordance with the invention showing the hard top in the normal position, FIG. 2 is a view analogous to FIG. 1 showing the hard top folded and stowed in the trunk, FIG. 3 is partial sectional view of the trunk of the vehicle showing the rear crossmember and the trunk lid closed, and FIG. 4 is a perspective view in section of the rear crossmember and the trunk lid showing the device of the invention.

DETAILED DESCRIPTION OF THE PREFERRED EMBODIMENT

The appended figures show one embodiment of a device for opening and closing the trunk lid 1 and the rear crossmember 2 of a convertible vehicle with folding hard top 3 to enable the hard top to be moved into the trunk 4 and removed therefrom.

In this example the trunk lid 1 can open by rotating from the front towards the rear, about a hinge pin 5, as shown in FIG. 2.

In accordance with the invention, the device comprises means for rotating the rear crossmember 2 forwards and downwards when the trunk lid 1 rotates from the front towards the rear, as indicated in FIGS. 3 and 4, and rearwards and upwards when the trunk lid 1 rotates in the opposite direction.

In the embodiment shown in FIG. 4, the above means comprise a coupling between the trunk lid 1 and the rear crossmember 2 in the form of a Bowden cable (cable 6, sheath 7).

As shown in FIGS. 3 and 4, the rear crossmember 2 is supported by a member 8 attached to the crossmember and articulated about a hinge pin 9 to a member 10 fixed to the plate 11 at the back of the trunk 4.

This back plate 11 of the trunk has a cavity 12 in its upper part, facing the hinge pin 9 of the articulation between the two members 8 and 10, its shape being dictated by the rotation and the shape of the rear crossmember 2.

As seen more clearly in FIG. 4, forward rotation of the rear crossmember 2 is actuated by the Bowden cable (cable 6, sheath 7) the ends of which are attached to the member 10 fixed to the back plate 11 of the trunk and to a fixed member 12a near the hinge axis of the trunk lid 1.

To be more precise, the end of the cable 6/7 adjacent the member 12a is fixed to a swan-neck 13 that connects the hinge pin 5 to the trunk lid 1.

Rearward rotation of the rear crossmember 2 is actuated by a spring 14 mounted on the hinge pin 9 of the member 8 attached to the rear crossmember 2 so as to tension the cable 6 mechanically.

The device just described operates in the following manner:

To open the hard top of the vehicle the trunk lid 1 is opened, for example by an electric motor, by rotating it from the front towards the rear about the hinge pin 5.

The rotation of the trunk lid 1 entrains the cable 6/7 which causes the rear crossmember 2 to pivot forwards and downwards about the member 10.

The rear crossmember 2 then faces the cavity 12 of the back plate 11.

With the trunk lid 1 open and the rear crossmember moved out of the way the hard top can be moved into the trunk 4.

Of course, the invention is not limited to the embodiment just described and many modifications can be made thereto without departing from the scope of the invention.

What is claimed is:

1. A device for causing movement of a rear crossmember of a convertible vehicle having a foldable hard top to enable said hard top to be moved into a trunk of said vehicle and removed therefrom wherein said trunk lid opens by rotation about a hinge axis so that during opening a front part of said trunk lid moves upwardly and rearwardly from a trunk closed position to a trunk open position, said device comprising:

rotation means for rotating said rear cross member from a first closed position to a second open position forward and downward of said first closed position during movement of said trunk lid to said trunk open position and for rotating said rear crossmember upwardly and rearwardly from said second open position to said first closed position during movement of said trunk lid from said trunk open position to said trunk closed position;

said trunk having a front and a back; and said rear crossmember being supported by a first member attached thereto and said first member being joined by an articulation to a second member fixed to a plate at the back of said trunk.

2. The device claimed in claim 1 wherein said rotation means comprises a coupling between said trunk lid and said rear crossmember in the form of a Bowden cable.

3. The device claimed in claim 1 wherein said plate at the back of said trunk has a cavity facing said articulation between said first and second members, said cavity having a shape which permits said rear crossmember to move between said first and second positions.

4. The device claimed in claim 1 wherein said rotation means comprises a Bowden cable respective ends of which are attached to said second member fixed to said plate at the back of said trunk and to a fixed member near the hinge axis of said trunk lid, and wherein said Bowden cable causes rotation of said rear crossmember from said first position to said second position.

5. The device claimed in claim 4 wherein said rotation means further comprises a spring mounted on a hinge pin of said first member attached to said rear crossmember so as to tension said Bowden cable mechanically and so as to actuate rearward rotation of said rear crossmember from said second position to said first position.

6. The device as claimed in claim 1 wherein said articulation is formed by a hinge pin about which said first member rotates relative to said second member.

* * * * *